Patented Sept. 21, 1954

2,689,852

UNITED STATES PATENT OFFICE 2,689,852

PYRIDINE DERIVATIVES

Herman Herbert Fox, Passaic, N. J., assignor to Hoffmann-La Roche Inc., Nutley, N. J., a corporation of New Jersey No Drawing. Application November 3, 1951, Serial No. 254,802

10 Claims. (Cl. 260—295)

1

This invention relates to new derivatives of isonicotinylhydrazine, and more particularly to 1-isonicotinyl-2-acyl-hydrazines, wherein the acyl radical is a member of the class consisting of an aliphatic carboxylic acid acyl and an aromatic carboxylic acid acyl. The term aromatic carboxylic acid acyl denotes a carboxylic acid acyl in which the CO group thereof is attached to a benzene nucleus. The aliphatic carboxylic acid acyl radical may be saturated or unsaturated, and the aromatic carboxylic acid acyl may be substituted or unsubstituted.

The compounds comprising my invention may be represented by the following formula:

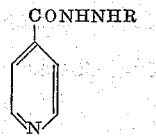

In the above formula R stands for an aliphatic carboxylic acid acyl, e. g., alkanoyl, substituted alkanoyl, alkenoyl, and substituted alkenoyl; and an aromatic carboxylic acid acyl, e. g., benzoyl and substituted benzoyl.

The new compounds are useful in the field of therapeutics, and more particularly are useful as antituberculosis agents. In general, they can be prepared by reacting isonicotinylhydrazine (alternatively known as isonicotinic acid hydrazide) with the anhydrides or acyl halides of aliphatic carboxylic acids and aromatic carboxylic acids to form the corresponding 1-isonicotinyl-2-acyl-hydrazines. According to another procedure, the compounds can be prepared by reacting isonicotinyl chloride or its hydrochloride with the corresponding acyl hydrazines, which can be represented by the formula $H_2NNHR$, R having the same meaning already assigned thereto.

The following examples will serve to illustrate the preparation of the compounds comprising the invention.

Example 1

To 15 grams of acetic anhydride were added, portionwise, with shaking, 14 grams of isonicotinylhydrazine. The mixture was then heated on a steam bath for 15 minutes, and finally treated with an excess of ether, whereupon 1-isonicotinyl-2-acetylhydrazine precipitated. It was filtered off and upon recrystallization from ethyl acetate, the compound melted at 161° C.

Example 2

30 cc. of propionic anhydride and 20 grams of isonicotinylhydrazine were reacted in accordance with the procedure described in Example 1. The precipitate obtained was 1-isonicotinyl-2-propionylhydrazine, which, upon recrystallization from ethyl acetate, melted at 130.5–131.5° C.

Example 3

To a refluxing solution of 20 grams of isonicotinylhydrazine in 250 cc. of dry dioxane were added, dropwise, 15.5 grams of butyryl chloride in 15 cc. of dioxane. After the addition was complete, the mixture was refluxed for about 10 more minutes and then permitted to stand for about one hour. The precipitate was filtered off, washed with ether, dried, and then dissolved in a slight excess of concentrated ammonium hydroxide. The alkaline solution was evaporated to dryness under vacuum and the residue was extracted several times with hot chloroform. The chloroform extracts were combined and filtered, and the chloroform was evaporated off, leaving a deposit of 1-isonicotinyl-2-butyrylhydrazine which, upon recrystallization from ethyl acetate, melted at 139–139.5° C.

The 1-isonicotinyl-2-butyrylhydrazine was also prepared by reacting 20 grams of isonicotinylhydrazine and 35 cc. of butyric anhydride by the same procedure as described in Example 1.

Example 4

A mixture of 30 grams of isonicotinylhydrazine, 22 grams of maleic anhydride, and 300 cc. of dioxane was heated on a steam bath for one-half hour. 1 - isonicotinyl - 2 - (β - carboxyacrylyl) hydrazine precipitated and was recovered by filtration.

Example 5

To a solution of 35 grams of benzoic acid anhydride and 300 cc. of dioxane were added 20 grams of isonicotinylhydrazine, and the mixture was heated on a steam bath for about one-half hour. 1-isonicotinyl-2-benzoylhydrazine precipitated. The mixture was cooled to room temperature and the 1-isonicotinyl-2-benzoylhydrazine was filtered off. Upon recrystallization from methanol, it was obtained in the form of fine white needles, melting at 227.5–228.5° C.

Example 6

30 grams of isonicotinylhydrazine and 32.5 grams of phthalic anhydride were reacted by the same procedure as described in Example 5 to yield 1-isonicotinyl-2-(o-carboxybenzoyl) hydrazine in the form of white crystals, which melted at 178.5° C. Five grams of 1-isonicotinyl-2-(o-carboxybenzoyl) hydrazine were heated at 200–

220° C. for 15–30 minutes, and the melt was permitted to cool, whereupon a solid substance was obtained, which, upon recrystallization from isopropanol, melted at 223.5–225.5° C. The compound analyzed for the empirical formula $C_{14}H_9O_3N_3$.

*Example 7*

To a mixture of 13.7 grams isonicotinylhydrazine in 100 cc. dry dioxane heated on a steam bath under reflux was added dropwise a solution of 30.2 grams of stearoyl chloride in 200 cc. benzene. Immediate precipitation took place, and the thick mass was heated for about an hour after addition was completed. The mixture was then cooled, filtered, and the solid was suspended in about 300 cc. of 3 N ammonium hydroxide. The suspension was filtered, and the solid product was recrystallized from isopropanol to give white needles of 1 - isonicotinyl - 2 - stearoylhydrazine which melted at 125–126° C.

*Example 8*

To 13.7 grams of isonicotinylhydrazine dissolved in 100 cc. of refluxing pyridine were added dropwise 27.5 grams of palmitoyl chloride at such a rate as to keep the mixture refluxing upon removal of the external heat source. When the addition was completed, the mixture was refluxed for about 10 more minutes. To the hot solution were then added about 100 cc. of water, and on cooling 1-isonicotinyl-2-palmitoylhydrazine precipitated. The product was filtered and recrystallized from dilute aqueous isopropanol to yield fine white needles and flakes which melted at 118–121° C.

*Example 9*

A mixture of 4.8 grams 1-isonicotinyl-2-(β-carboxyacrylyl)hydrazine and 150 cc. of methanol was treated with hydrogen at about 50 p. s. i. and 60° C. in the presence of 100 mg. of finely divided platinum catalyst. When the theoretical quantity of hydrogen had been taken up, the methanol was removed and the product was recrystallized from water. The 1-isonicotinyl-2-(β-carboxypropionyl)hydrazine was obtained in the form of fine white needles which melted at 223.5–224.5° C.

I claim:

1. 1 - isonicotinyl - 2 - acyl - hydrazines, wherein the acyl radical is a member of the class consisting of alkanoyl, carboxyalkanoyl, alkenoyl, carboxalkenoyl, benzoyl, and carboxybenzoyl radicals.
2. 1 - isonicotinyl - 2 - acyl - hydrazines, wherein the acyl radical is a carboxybenzoyl radical.
3. 1 - isonicotinyl - 2 - acyl-hydrazines, wherein the acyl radical is a carboxyalkenoyl radical.
4. 1-isonicotinyl-2-alkanoyl-hydrazines.
5. 1-isonicotinyl-2-acetylhydrazine.
6. 1 - isonicotinyl - 2 - (o - carboxybenzoyl)-hydrazine.
7. 1 - isonicotinyl - 2 - (β - carboxyacrylyl)-hydrazine.
8. 1-isonicotinyl-2-palmitoyl-hydrazine.
9. 1-isonicotinyl-2-stearoyl-hydrazine.
10. 1-isonicotinyl-2-benzoylhydrazine.

References Cited in the file of this patent

Gautier: "Chem. Abst." (1946), vol. 40, p. 3118.
Graf: "Journal für Praktische Chemie" (1933), vol. 138, pp. 289–91.
Taylor et al.: "Org. Chem. of Nitrogen" (1942), p. 522.
Fieser et al.: "Org. Chem." (1944), p. 32.